(12) United States Patent
Roeder et al.

(10) Patent No.: US 12,028,441 B2
(45) Date of Patent: Jul. 2, 2024

(54) ZERO-KNOWLEDGE ENCRYPTION PROTOCOL FOR SENSITIVE DATA

(71) Applicant: SAP SE, Walldorf (DE)

(72) Inventors: Marc Alexander Roeder, Wiesloch (DE); Roland Lucius, Wiesbaden (DE); Vladislav Dexheimer, Heidelberg (DE)

(73) Assignee: SAP SE, Walldorf (DE)

( * ) Notice: Subject to any disclaimer, the term of this patent is extended or adjusted under 35 U.S.C. 154(b) by 374 days.

(21) Appl. No.: 17/509,490

(22) Filed: Oct. 25, 2021

(65) Prior Publication Data

US 2023/0125608 A1 Apr. 27, 2023

(51) Int. Cl.
| | |
|---|---|
| *H04K 1/00* | (2006.01) |
| *G06F 21/60* | (2013.01) |
| *H04L 9/00* | (2022.01) |
| *H04L 9/06* | (2006.01) |
| *H04L 9/30* | (2006.01) |
| *H04L 9/32* | (2006.01) |

(52) U.S. Cl.
CPC .......... *H04L 9/0618* (2013.01); *G06F 21/602* (2013.01); *H04L 9/30* (2013.01); *H04L 9/3247* (2013.01)

(58) Field of Classification Search
CPC ....... H04L 9/0618; H04L 9/30; H04L 9/3247; G06F 21/602

USPC .......................................................... 380/30
See application file for complete search history.

(56) References Cited

U.S. PATENT DOCUMENTS

| | | | |
|---|---|---|---|
| 2019/0147170 A1* | 5/2019 | Keselman | G06F 21/602 713/189 |
| 2020/0177382 A1* | 6/2020 | Perlman | H04L 9/14 |
| 2020/0322139 A1* | 10/2020 | Hersans | H04L 9/14 |

* cited by examiner

*Primary Examiner* — Brandon Hoffman
*Assistant Examiner* — Samuel Ambaye
(74) *Attorney, Agent, or Firm* — Sterne, Kessler, Goldstein & Fox P.L.L.C.

(57) ABSTRACT

Disclosed herein are system, method, and computer program product embodiments for encrypting and decrypting a sensitive data item using a zero-knowledge encryption protocol. An embodiment operates by receiving a request to decrypt the sensitive data item from a client. The embodiment retrieves the requested sensitive data item from a data store. The embodiment generates a result set by replacing a ciphertext value of the sensitive data item to be stored in the result set with a placeholder identifier. The embodiment retrieves a data encryption key (DEK) block from a DEK manager, wherein the DEK block comprises a DEK associated with the sensitive data item. The embodiment generates and encrypts a cipher ticket comprising the ciphertext value of the sensitive data item. The embodiment then sends the result set, the cipher ticket, and the DEK block to the client for decryption of the ciphertext value of the sensitive data item.

20 Claims, 6 Drawing Sheets

ZERO-KNOWLEDGE ENCRYPTION PROTOCOL FOR SENSITIVE DATA

BACKGROUND

Many computing systems (e.g., cloud computing systems, file hosting systems, etc.) store highly confidential information. Breaches of such data can lead to severe legal, financial, and reputation consequences. Accordingly, such data is often stored in encrypted form to reduce the amount of sensitive data readable and obtainable by third parties (e.g., the cloud provider). The secrets required for encryption and decryption are often stored in secured areas of the computing system, and the computing system often has access to the non-encrypted (e.g., non-sensitive or ordinary data) to perform functions (e.g., business functions). However, administrators of the computing system may still get access to the plaintext of the encrypted sensitive data because of their privileged access. Moreover, while end-to-end encryption of the entire application data may prevent access to the sensitive data, it often not feasible in computing systems because it often prevents software from executing both simple and complex functions (e.g., financial operations, arithmetic operations, and complex business functions). Therefore, there is a need to make sensitive data inaccessible to administrators of a computing system in plaintext format while retaining the ability of the software to execute both simple and complex functions on the non-encrypted data (e.g., non-sensitive or ordinary data).

BRIEF DESCRIPTION OF THE DRAWINGS

The accompanying drawings are incorporated herein and form a part of the specification.

In the drawings, like reference numbers generally indicate identical or similar elements. Additionally, generally, the left-most digits) of a reference number identifies the drawing in which the reference number first appears.

DETAILED DESCRIPTION

Provided herein are system, apparatus, device, method and/or computer program product embodiments, and/or combinations and sub-combinations thereof, for utilizing a zero-knowledge encryption protocol to make sensitive data inaccessible to administrators of a computing system (e.g., a cloud computing system, file hosting system, etc.) in plaintext format while retaining the ability of the software to execute both simple and complex functions on the non-encrypted data (e.g., non-sensitive or ordinary data).

The utilization of the zero-knowledge encryption protocol enables an application (e.g., an application server) to control encryption/decryption in a cryptographically secure way even though the encryption/decryption process happens in a stand-alone component (e.g., a crypto service). In other words, the application can retain business logic and context even though it does not have access to the plaintext of encrypted sensitive data. The zero-knowledge encryption protocol solves a major technological problem of systems where the user (e.g., an administrator) of the application (e.g., an application server) has unconditional access to decryption keys, and thus may only be restricted to accessing the plaintext of the encrypted sensitive data by checks performed in the crypto service itself.

The utilization of the zero-knowledge encryption protocol also provides various performance advantages. The utilization of the zero-knowledge encryption protocol does not require routing traffic through a bottleneck service. This is because the zero-knowledge encryption protocol may only route sensitive data to the crypto service, and thus the zero-knowledge encryption protocol does not reduce the performance of the system as much as other approaches. The utilization of the zero-knowledge encryption protocol also does not require any modifications to traffic routing or network infrastructure. Finally, the utilization of the zero-knowledge encryption protocol does not add a significant amount of operational or latency time to the individual data request.

Embodiments herein solve these technological problems through proxy-communication between an application (e.g., an application server) and a crypto service via a client that is secured by asymmetric cryptography. Embodiments herein further solve these technological problems through the inclusion of a user identity and a valid to timestamp in a cipher ticket, thereby preventing replay attacks and restricting usage.

Figure 1:
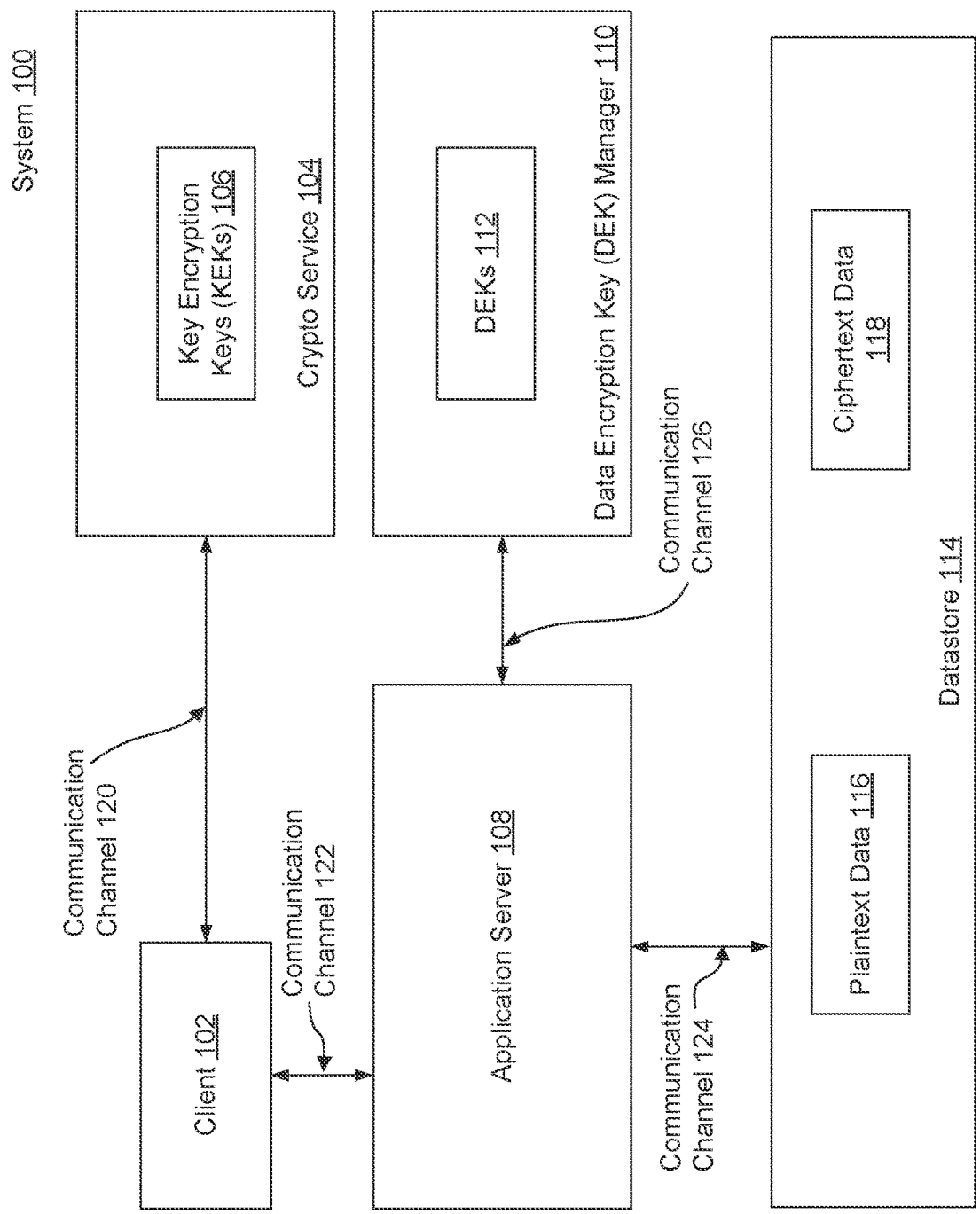
FIG. 1 is a block diagram of a system that uses a zero-knowledge encryption protocol to make sensitive data inaccessible to administrators of the system in plaintext format while retaining the ability of the software to execute simple and complex functions, according to some embodiments.

FIG. 1 is a block diagram of a system 100 that uses a zero-knowledge encryption protocol to make sensitive data inaccessible to administrators of system 100 in plaintext format while retaining the ability of the software to execute both simple and complex functions, according to some embodiments. System 100 may be a cloud-computing platform. System 100 may be a private cloud-computing platform. System 100 may be a hosted system. System 100 may be various other types of software platforms as would be appreciated by a person of ordinary skill in the art.

System 100 may include client 102, crypto service 104, application server 108, data encryption key (DEK) manager 110, and datastore 114.

Client 102 may be a software application that displays an application running on application server 108. For example, client 102 may a web browser. Client 102 may be implemented on a desktop computer, laptop, tablet, smartphone, or other device as would be appreciated by a person of ordinary skill in the art.

Client 102 may communicate with application server 108 over communications path 122, which may be wired and/or wireless (or a combination thereof), and which may include any combination of Local Area Networks (LANs), Wide Area Networks (WANs), the Internet, etc. Control logic and/or data may be transmitted to and from client 102 via communication path 122. Communications path 122 may be encrypted between client 102 and application server 108 using a security protocol such as Transport Layer Security (TLS).

Application server 108 may run the application displayed on client 102. Application server 108 may be implemented on a server computer, virtual machine, container, cloud computing platform, or other device as would be appreciated by a person of ordinary skill in the art.

The application running on application server 108 may utilize both ordinary data and sensitive data. Ordinary data may include data that does not need to be protected to the same extent as sensitive data, and that can be accessed by outside parties. For example, ordinary data may include data such as an email address. Sensitive data may include classified information that may need to be protected more than ordinary data, and that may need to be inaccessible to outside parties. For example, sensitive data may include data that must be inaccessible to users (e.g., administrative users) of application server 108. In some embodiments, ordinary data may include file names or file identifiers, and the sensitive data may include the file contents themselves.

Application server 108 may access ordinary data and sensitive data from datastore 114. Application server 108 may communicate with datastore 114 over communications path 124, which may be wired and/or wireless (or a combination thereof), and which may include any combination of LANs, WANs, the Internet, etc. Control logic and/or data may be transmitted to and from application server 108 via communication path 124.

Communications path 124 may be encrypted between application server 108 and datastore 114 using a security protocol such as TLS.

Datastore 114 may be a datastore that stores ordinary data and/or sensitive data used by application server 108. Datastore 114 may be database management system (DBMS). Datastore 114 may be implemented on a server computer, virtual machine, container, cloud computing platform, or other device as would be appreciated by a person of ordinary skill in the art.

Datastore 114 may store ordinary data in plaintext as plaintext data 116. Datastore 114 may store sensitive data in ciphertext as ciphertext data 118. Ciphertext data 118 may be encrypted using a data encryption key (DEK) 112 from DEK manager 110. DEK 112 may be a symmetric encryption key such as, but not limited to, Advanced Encryption Standard (AES), Rivest Cipher 5 (RC5), and RC6.

Application server 108 may only access sensitive data in ciphertext format (e.g., as ciphertext data 118). Application server 108 may not access sensitive data in plaintext format. Client 102 may access sensitive data in plaintext format. However, client 102 may only decrypt the sensitive data using crypto service 104. Client 102 may also be unable to access the sensitive data in data store 114 directly. Client 102 may not access sensitive data in ciphertext format (e.g., as ciphertext data 118). For example, this may occur when client 102 receives the sensitive data in a cipher ticket encrypted with the public key of crypto service 104.

To facilitate encryption and decryption of sensitive data, client 102 and application server 108 may interact with crypto service 104 and DEK manager 110. DEK manager 110 may store DEKs 112. A DEK 112 may be a DEK encrypted by a key encryption key (KEK) 106 in crypto service 104. KEK 106 may be a symmetric encryption key such as, but not limited to, AES or RC5. A DEK 112 may be used to encrypt and decrypt sensitive data. DEK manager 110 may be implemented on a server computer, virtual machine, container, cloud computing platform, or other device as would be appreciated by a person of ordinary skill in the art.

DEK manager 110 may be standalone component with no direct communication channel to crypto service 104. Advantages of this approach include the separation of encryption layers and DEK manager 110 being severed from crypto service 104. To further strengthen the separation of responsibilities, DEK manager 110 can be either hosted by a customer or a trusted third party.

DEK manager 110 may also be part of application server 108. DEK manager 110 may also be part of crypto service 104. In this case, application server 108 may not need to access DEK manager 110, and DEK blocks do not need to be sent between application server 108 and client 102.

Application server 108 may access the encrypted DEKs 112 stored in DEK manager 110. Application server 108 may not access the unencrypted DEKs 112. Application server 108 may communicate with DEK manager 110 over communications path 126, which may be wired and/or wireless (or a combination thereof), and which may include any combination of LANs, WANs, the Internet, etc. Control logic and/or data may be transmitted to and from application server 108 via communication path 126. Communications path 126 may be encrypted between application server 108 and DEK manager 110 using a security protocol such as TLS.

Crypto service 104 may encrypt and decrypt sensitive data. However, crypto service 104 may not be able to map a sensitive data value to an underlying field name because it does not have access to the underlying field name. Rather, crypto service 104 may only map a sensitive data value to a temporary placeholder identifier.

Crypto service 104 may store KEKs 106. A KEK 106 may be a cryptography key. Crypto service 104 may encrypt a DEK 112 for storage in DEK manager 110 using a KEK 106. Crypto service 104 may be implemented on a server computer, virtual machine, container, cloud computing platform, or other device as would be appreciated by a person of ordinary skill in the art.

Client 102 may access crypto service 104 to facilitate encryption and decryption of sensitive data. Client 102 may communicate with crypto service 104 over communications path 120, which may be wired and/or wireless (or a combination thereof), and which may include any combination of LANs, WANs, the Internet, etc. Control logic and/or data may be transmitted to and from client 102 via communication path 120. Communications path 120 may be encrypted between client 102 and crypto service 104 using a security protocol such as TLS.

Figure 2:
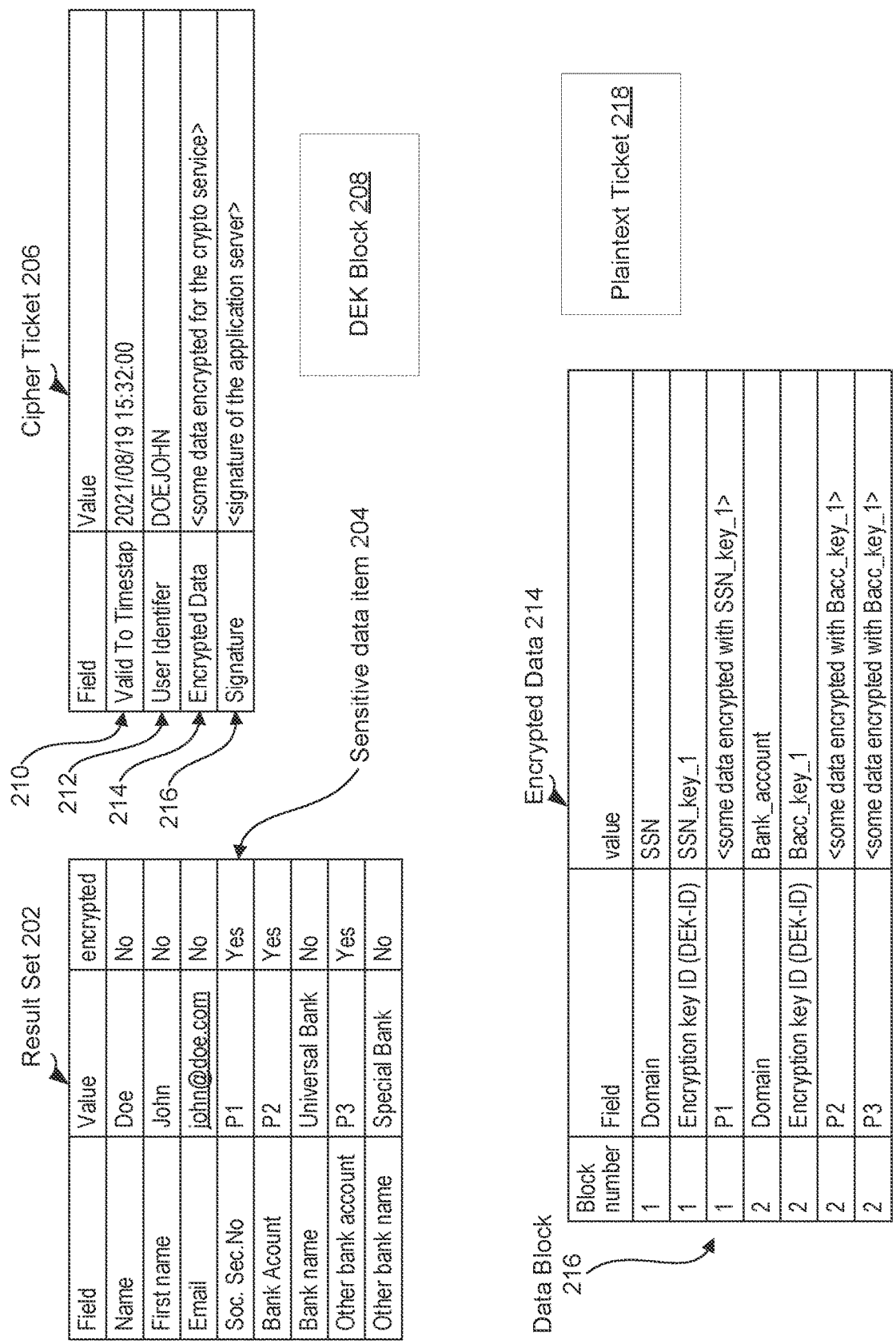
FIG. 2 is a block diagram illustrating how a client may access a crypto service to facilitate decryption of sensitive data, according to some embodiments.

For client 102 to access the plaintext of ciphertext data 118, client 102 and application server 108 may interact with crypto service 104 and DEK manager 110. FIG. 2 is a block diagram illustrating how client 102 may access crypto service 104 to facilitate decryption of sensitive data, according to some embodiments. FIG. 2 is described with reference to FIG. 1. However, FIG. 2 is not limited to that example embodiment.

To access the plaintext of ciphertext data 118, client 102 may access crypto service 104 and application server 108, and application server 108 may access DEK manager 110 and datastore 114. Prior to client 102 accessing crypto service 104 and application server 108, client 102 may establish secure communication channels with crypto service 104 and application server 108 (e.g., communication channels 120 and 122). Similarly, application server 108 may establish secure communication channels with DEK manager 110 and datastore 114 (e.g., communication channels 124 and 126).

To access the plaintext of ciphertext data 118, client 102 may send a request to application server 108 for data stored in datastore 114. The request may be for plaintext data 116 and/or the plaintext of ciphertext data 118. In response to the request, application server 108 may request the requested data from datastore 114.

If client 102's request is for the plaintext of ciphertext data 118, application server 108 may request ciphertext data 118 from datastore 114. Application server 108 may not access the plaintext of ciphertext data 118.

Application server 108 may receive the requested ciphertext data 118 from datastore 114 such that each sensitive data item in the requested ciphertext data 118 has been encrypted by a respective DEK 112. Each respective DEK 112 may be stored in encrypted format in DEK manager 110.

Application server 108 may generate a result set 202 containing the requested data for client 102. Application server 108 may include ordinary data items from plaintext data 116 in result set 202. An ordinary data item may be a data item that does not need to be protected and may be accessed by outside parties. For example, application server 108 may include an ordinary data item such as "First name" having a value of "John" in result set 202.

Application server 108 may also include sensitive data items from ciphertext data 118 in result set 202. A sensitive data item may be a data item that must be protected and inaccessible to outside parties. A sensitive data item may be a data item that must be inaccessible to users (e.g., administrative users) of application server 108. For example, application server 108 may include sensitive data item 204 in result set 202. Sensitive data item 204 may represent a Social Security Number and have a respective encrypted (or ciphertext) value.

Application server 108 may modify each sensitive data item for inclusion in result set 202. For example, application server 108 may replace the encrypted value of each sensitive data item with a respective placeholder identifier. Application server 108 may also add an encryption field to each data item indicating whether the value of the respective data item has been encrypted. For example, application server 108 may replace the encrypted value of sensitive data item 204 with the placeholder identifier "P1" and add an "Encrypted" value indicating sensitive data item 204's value is encrypted.

Application server 108 may request the DEKs 112 from DEK manager 110. DEK manager 110 may include the requested DEKs 112 in DEK block 208. For example, DEK manager 110 may include a data item for each DEK 112 in DEK block 208. Each data item may include a DEK identifier for the respective DEK 112, a KEK identifier for the respective DEK 112, and the encrypted DEK 112 itself. The KEK identifier may identify a KEK 106 in crypto service 104 that encrypted the respective DEK 112. DEK manager 110 may encrypt the data items in DEK block 208 using crypto service 104's public cryptography key. For example, a public cryptography key may be implemented using Rivest-Shamir-Adleman (RSA) encryption, elliptic-curve cryptography encryption, or various other public-key cryptography approaches as would be appreciated by a person of ordinary skill in the art.

DEK manager 110 may also include a cryptography signature in DEK block 208. DEK manager 110 may generate the cryptography signature by signing DEK block 208 using its private cryptography key. For example, a private cryptography key may be implemented using RSA encryption, elliptic-curve cryptography encryption, or various other public-key cryptography approaches as would be appreciated by a person of ordinary skill in the art. A recipient of DEK block 208 may confirm that DEK block 208 has not been changed since DEK manager 110 signed it by verifying the cryptography signature using the corresponding public cryptography key of DEK manager 110. DEK manager 110 may send DEK block 208 to application server 108.

Application server 108 may generate cipher ticket 206. Client 102, via crypto service 104, may use cipher ticket 206 to access the plaintext of the requested ciphertext data 118. Application server 108 may include various metadata items in the cipher ticket 206 to enable enforcement of the authorization concept on the encrypted data. For example, application server 108 may include a valid to timestamp 210 in cipher ticket 206. Valid to timestamp 210 may represent a period of time that the cipher ticket 206 is valid. Application server 108 may also include a user identifier 212 in cipher ticket 206. User identifier 212 may represent a principal (e.g., user, computing system, software program, or technical component) who can request crypto service 104 to process cipher ticket 206.

Application server 108 may include encrypted data 214 in cipher ticket 206.

Encrypted data 214 may include a data block for each sensitive data item in result set 202. For example, encrypted data 214 may include data block 216 for sensitive data item 204 in result set 202. A data block may include a semantic domain. A semantic domain may indicate a field name of the respective sensitive data item. A semantic domain may also indicate a category of the respective sensitive data item as opposed to the field name itself. A data block may include a DEK identifier. A DEK identifier may be an identifier for the respective DEK 112 used to encrypt the respective sensitive data item. A data block may include a data point for sensitive data item 204. A data point may include the placeholder identifier and ciphertext value of the respective sensitive data item.

The data block may also include a decryption type. The decryption type may specify that the respective sensitive data item is to be decrypted to full plaintext. The decryption type may also specify that the respective sensitive data item is to be decrypted with a partial mask (e.g., "778-62-XXXX").

In some embodiments, application server 108 may encrypt encrypted data 214 using the public cryptography key of crypto service 104. This can prevent client 102 from accessing the ciphertext values in cipher ticket 206.

In some other embodiments, application server 108 may encrypt encrypted data 214 using a symmetric cryptography key. Application server 108 may then encrypt the symmetric cryptography key using a public cryptography key of crypto service 104. Application server 108 may store the encrypted symmetric key in cipher ticket 206. This hybrid approach may decrease the time to perform the encryption when there is a large of number of data points representing sensitive data items.

Application server 108 may include a cryptography signature 216 in cipher ticket 206. As a result, crypto service 104 may not need to know any application metadata. Application server 108 may generate cryptography signature 216 by signing cipher ticket 206 using its private cryptography key. For example, application server 108 may generate cryptography signature 216 by signing valid to timestamp 210, user identifier 212, and encrypted data 214 in cipher ticket 206 using its private cryptography key. A recipient of cipher ticket 206 may confirm that cipher ticket 206 has not been changed since application server 108 signed it by verifying cryptography signature 216 using the corresponding public cryptography key of application server 108.

Application server 108 may send result set 202, cipher ticket 206, and DEK block 208 to client 102. Because result set 202 includes a placeholder identifier for the encrypted value of each respective sensitive data item from the requested ciphertext data 118, client 102 does not have access to the ciphertext value of each respective sensitive data item.

To access the plaintext of the requested ciphertext data 118, client 102 may send cipher ticket 206 and DEK block 208 to crypto service 104. Crypto service 104 may validate cipher ticket 206. Crypto service 104 may confirm that the correct principal (e.g., user, computing system, software program, or technical component) sent cipher ticket 106. For example, crypto service 104 may confirm that a principal of client 102 that sent cipher ticket 206 to crypto service 104 matches user identifier 212 in cipher ticket 206. Crypto service 104 may confirm that the cipher ticket 206 has not expired. For example, crypto service 104 may confirm that client 102 sent cipher ticket 206 to crypto service 104 before the expiration of valid to timestamp 210. Crypto service 104 may confirm that no intermediary entity modified cipher ticket 206 since it was generated. For example, crypto service 104 may verify cryptography signature 216 in cipher ticket 206 using the corresponding public cryptography key of application server 108.

After validating cipher ticket 206, crypto service 104 may decrypt encrypted data 214 in cipher ticket 206. In some embodiments, crypto service 104 may decrypt encrypted data 214 using its private cryptography key.

In some other embodiments, where application server 108 encrypted encrypted data 214 using an encrypted symmetric cryptography key stored in cipher ticket 206, crypto service 104 may first decrypt the symmetric cryptography key stored in cipher ticket 206 using its private cryptography key. Crypto service 104 may then decrypt encrypted data 214 using the decrypted symmetric cryptography key.

After decrypting encrypted data 214 in cipher ticket 206, crypto service 104 may decrypt DEK block 208 using its private cryptography key. Crypto service 104 may then decrypt a ciphertext value of a data point in a data block 216 in decrypted encrypted data 214 using a respective DEK in the decrypted DEK block 208. For example, crypto service 104 may decrypt the encrypted DEK in decrypted. DEK block 208 using its respective KEK 106. Crypto service 104 may then use the decrypted DEK to decrypt the ciphertext value of the data point in the data block 216 in decrypted encrypted data 214.

After decrypting the ciphertext values in the data blocks, crypto service 104 may generate plaintext ticket 218. Plaintext ticket 218 may include a data block for each sensitive data item in result set 202. For example, plaintext ticket 218 may include a data block for sensitive data item 204 in result set 202. A data block may include a semantic domain, a DEK identifier, and a data point for a sensitive data item. The semantic domain may indicate the field name of the respective sensitive data item. The DEK identifier may be an identifier for the DEK 112 to be used to encrypt the respective sensitive data item. The data point may include the placeholder identifier and the plaintext value of the respective sensitive data item. For example, for sensitive data item 204, the data point may map placeholder identifier "P1" to the plaintext value "778-62-8144". The data block may also include a decryption type. The decryption type may specify that the respective sensitive data item is decrypted to full plaintext. The decryption type may also specify that the respective sensitive data item is decrypted with a partial mask (e.g., "778-62-XXXX").

Crypto service 104 may encrypt plaintext ticket 218 using the public cryptography key of client 102. Moreover, even if an eavesdropper intercepts plaintext ticket 218, they may only be able to map the plaintext values of the sensitive data items to temporary placeholder identifiers. As a result, the eavesdropper may not know who or what the plaintext values of the sensitive data items relate to. For example, if a plaintext value is that of a social security number, the eavesdropper does not know who the social security number belongs to. Crypto service 104 may also skip encrypting plaintext ticket 218 using the public cryptography key of client 102.

Crypto service 104 may also include a cryptography signature in plaintext ticket 218. Crypto service 104 may generate the cryptography signature by signing plaintext ticket 218 using its private cryptography key. A recipient of plaintext ticket 218 may confirm that plaintext ticket 218 has not been changed since crypto service 104 signed it by verifying the cryptography signature using the corresponding public cryptography key of crypto service 104.

Crypto service 104 may send plaintext ticket 218 to client 102. Client 102 may then merge plaintext ticket 218 with result set 202. Client 102 may merge plaintext ticket 218 with result set 202 by replacing each placeholder identifier in result set 202 with the corresponding plaintext value in plaintext ticket 218. For example, client 102 may merge a data point with sensitive data item 204 by replacing "P1" in sensitive data item 204 with the corresponding value in the data point (e.g., "778-62-8144").

Figure 3:
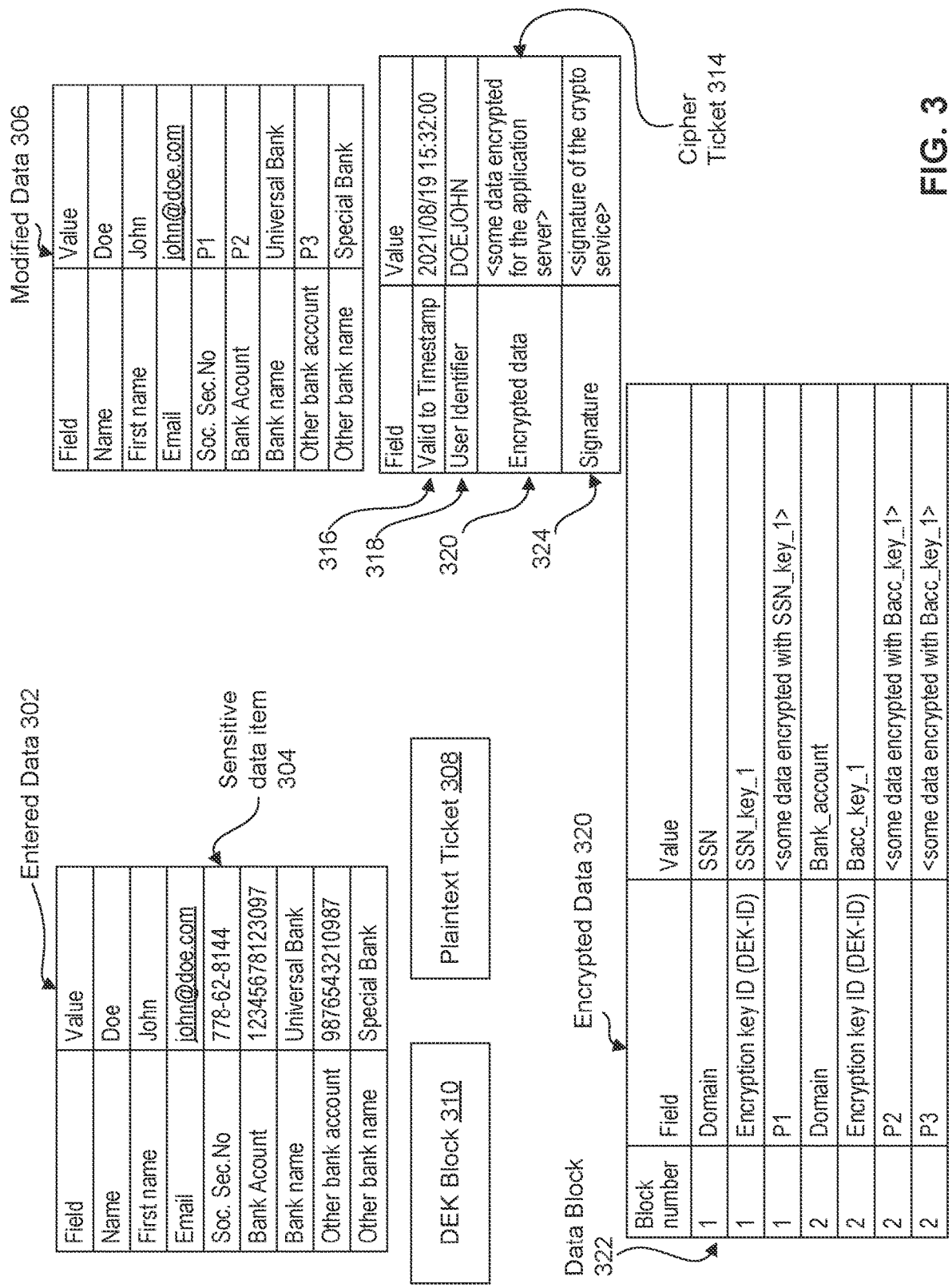
FIG. 3 is a block diagram illustrating how a client may access a crypto service to facilitate encryption of sensitive data, according to some embodiments.

FIG. 3 is a block diagram illustrating how client 102 may access crypto service 104 to facilitate encryption of sensitive data, according to some embodiments. FIG. 3 is described with reference to FIG. 1. However, FIG. 3 is not limited to that example embodiment.

To encrypt sensitive data items for storage in ciphertext data 118 in datastore 114, client 102 may access crypto service 104 and application server 108, and application server 108 may access DEK manager 110 and datastore 114. Prior to client 102 accessing crypto service 104 and application server 108, client 102 may establish secure communication channels with crypto service 104 and application server 108 (e.g., communication channels 120 and 122). Similarly, application server 108 may establish secure communication channels with DEK manager 110 and datastore 114 (e.g., communication channels 124 and 126).

Client 102 may receive entered data 302. Entered data 302 may be received from a user. Entered data 302 may include ordinary data items. For example, entered data 302 may include an ordinary data item such as "First name" having a value of "John." Entered data 302 may also include sensitive data items. For example, entered data 302 may include sensitive data item 304. Sensitive data item 304 may represent a Social Security Number and have a respective value (e.g., "778-62-8144").

To encrypt sensitive data items (e.g., sensitive data item 304) for storage in ciphertext data 118 in datastore 114, client 102 may request DEKs 112 (e.g., stored in encrypted format) for encrypting the sensitive data items in entered data 302. Application server 108 may then request the DEKs 112 from DEK manager 110, and DEK manager 110 may return the requested DEKs 112 in DEK block 310.

DEK manager 110 may include a data item for each DEK 112 in DEK block 310. Each data item may include a DEK identifier for the respective DEK 112, a KEK identifier for the KEK 106 that encrypted the respective DEK 112, and the encrypted DEK 112 itself. DEK manager 110 may encrypt the data items in DEK block 310 using crypto service 104's public cryptography key. DEK manager 110 may also include a cryptography signature in DEK block 310. DEK manager 110 may generate the cryptography signature by signing DEK block 310 using its private cryptography key. A recipient of DEK block 310 may confirm that DEK block 310 has not been changed since DEK manager 110 signed it by verifying the cryptography signature using the corresponding public cryptography key of DEK manager 110. DEK manager 110 may send DEK block 310 to application server 108, and application server 108 may send DEK block 310 to client 102.

Before submitting entered data 302 to application server 108 for storage in datastore 114, client 102 may replace the values of the sensitive data items in entered data 302 with corresponding placeholder identifiers, thereby generating modified data 306. For example, client 102 may replace the value of sensitive data item 304 (e.g., "778-62-8144") with placeholder identifier "P1."

Client 102 may also generate plaintext ticket 308. Plaintext ticket 308 may include a data block for each sensitive data item in modified data 306. For example, plaintext ticket 308 may include a data block for sensitive data item 304 in entered data 302. A data block may include a semantic domain, a DEK identifier, and a data point for a sensitive data item. The semantic domain may indicate the field name of the respective sensitive data item. The DEK identifier may be an identifier for the DEK 112 to be used to encrypt the respective sensitive data item. The data point may include the placeholder identifier and the plaintext value of the respective sensitive data item. For example, for sensitive data item 304, the data point may map placeholder identifier "P1" to the plaintext value "778-62-8144".

Client 102 may encrypt plaintext ticket 308 using the public cryptography key of crypto service 104. Crypto service 104 may also skip encrypting plaintext ticket 218 using a public cryptography key of crypto service 104. Client 102 may also include a cryptography signature in plaintext ticket 308. Client 102 may generate the cryptography signature by signing plaintext ticket 308 using its private cryptography key. A recipient of plaintext ticket 308 may confirm that plaintext ticket 308 has not been changed since client 102 signed it by verifying the cryptography signature using the corresponding public cryptography key of client 102.

Client 102 may send plaintext ticket 308 and DEK block 310 to crypto service 104. Crypto service 104 may generate cipher ticket 314. Crypto service 104 may include various metadata items in the cipher ticket 314 to enable the enforcement of the authorization concept. For example, crypto service 104 may include a valid to timestamp 316 in cipher ticket 314. Valid to timestamp 316 may represent a period of time that the cipher ticket 314 is valid. Crypto service 104 may include a user identifier 318 in cipher ticket 314. User identifier 318 may represent a principal (e.g., user, computing system, software program, or technical component) who requested crypto service 104 to process the cipher ticket 314. For example, user identifier 318 may represent the user who requested the creation of cipher ticket 314 and requested application server 108 to persist the decrypted encrypted data 320 inside cipher ticket 314 into the ciphertext data 118 of datastore 114.

Crypto service 104 may include encrypted data 320 in cipher ticket 314. Encrypted data 320 may include a data block for each sensitive data item in entered data 302. For example, encrypted data 320 includes data block 322 for sensitive data item 304. A data block may include a semantic domain, a DEK identifier, and a data point for a sensitive data item. The semantic domain may indicate the field name of the respective sensitive data item. The DEK identifier may be an identifier for the DEK 112 used to encrypt the respective sensitive data item. The data point may include the placeholder identifier and the ciphertext value of the respective sensitive data item.

To generate the ciphertext value for a sensitive data item, crypto service 104 may decrypt DEK block 310 using its private cryptography key. Crypto service 104 may then encrypt the plaintext value of the sensitive data item using the corresponding DEK 112 in DEK block 310. To perform the encryption, crypto service 104 may identify the corresponding DEK 112 in DEK block 310 (e.g., via the corresponding DEK identifier in DEK block 310). Crypto service 104 may also identify the KEK 106 used to encrypt the DEK 112 (e.g., via the corresponding KEK identifier in DEK block 310). Crypto service 104 may then decrypt the corresponding DEK 112 in DEK block 310 using the identified KEK 106. Once crypto service 104 has decrypted the DEK 112, crypto service 104 may encrypt the plaintext value of the sensitive data item using the decrypted DEK key 112. Crypto service 104 may then encrypt encrypted data 320 using the public cryptography key of application server 108.

Crypto service 104 may include a cryptography signature 324 in cipher ticket 314. Crypto service 104 may generate cryptography signature 324 by signing cipher ticket 314 using its private cryptography key. For example, crypto service 104 may generate cryptography signature 324 by signing valid to timestamp 316, user identifier 318, and encrypted data 320 in cipher ticket 314 using its private cryptography key. A recipient of cipher ticket 314 may confirm that cipher ticket 314 has not been changed since crypto service 104 signed it by verifying cryptography signature 324 using the corresponding public cryptography key of crypto service 104.

Crypto service 104 may send cipher ticket 314 to client 102. Client 102 may access sensitive data in plaintext format. However, client 102 may only decrypt the sensitive data using crypto service 104. Client 102 may also be unable to access the sensitive data in data store 114 directly. Client 102 may not access sensitive data in ciphertext format (e.g., as ciphertext data 118). For example, this may occur when client 102 receives the sensitive data in a cipherticket encrypted with the public key of crypto service 104.

Client 102 may send modified data 306 and cipher ticket 314 to application server 108 for storage of the ciphertext values of the sensitive data items in datastore 114. Upon receiving modified data 306 and cipher ticket 314, application server 108 may validate cipher ticket 314. Application server 108 may confirm that the correct principal (e.g., user, computing system, software program, or technical component) sent cipher ticket 106. For example, application server 108 may confirm that the principal of client 102 that sent cipher ticket 314 to application server 108 matches user identifier 318 in cipher ticket 314. Application server 108 may confirm that the cipher ticket 314 has not expired. For example, application server 108 may confirm that client 102 sent cipher ticket 314 to application server 108 before the expiration of valid to timestamp 316. Application server 108 may confirm that no intermediary entity modified cipher ticket 314 since it was generated. For example, application server 108 may verify cryptography signature 324 in cipher ticket 314 using the corresponding public cryptography key of crypto service 104.

After validating cipher ticket 314, application server 108 may decrypt encrypted data 320 in cipher ticket 314. For example, application server 108 may decrypt encrypted data 320 using its private cryptography key. Application server 108 may then merge ciphertext ticket 314 with the data in datastore 114. Application server 108 may merge the ciphertext values in cipher ticket 314 into datastore 114 based on the placeholder identifiers.

Figure 4:
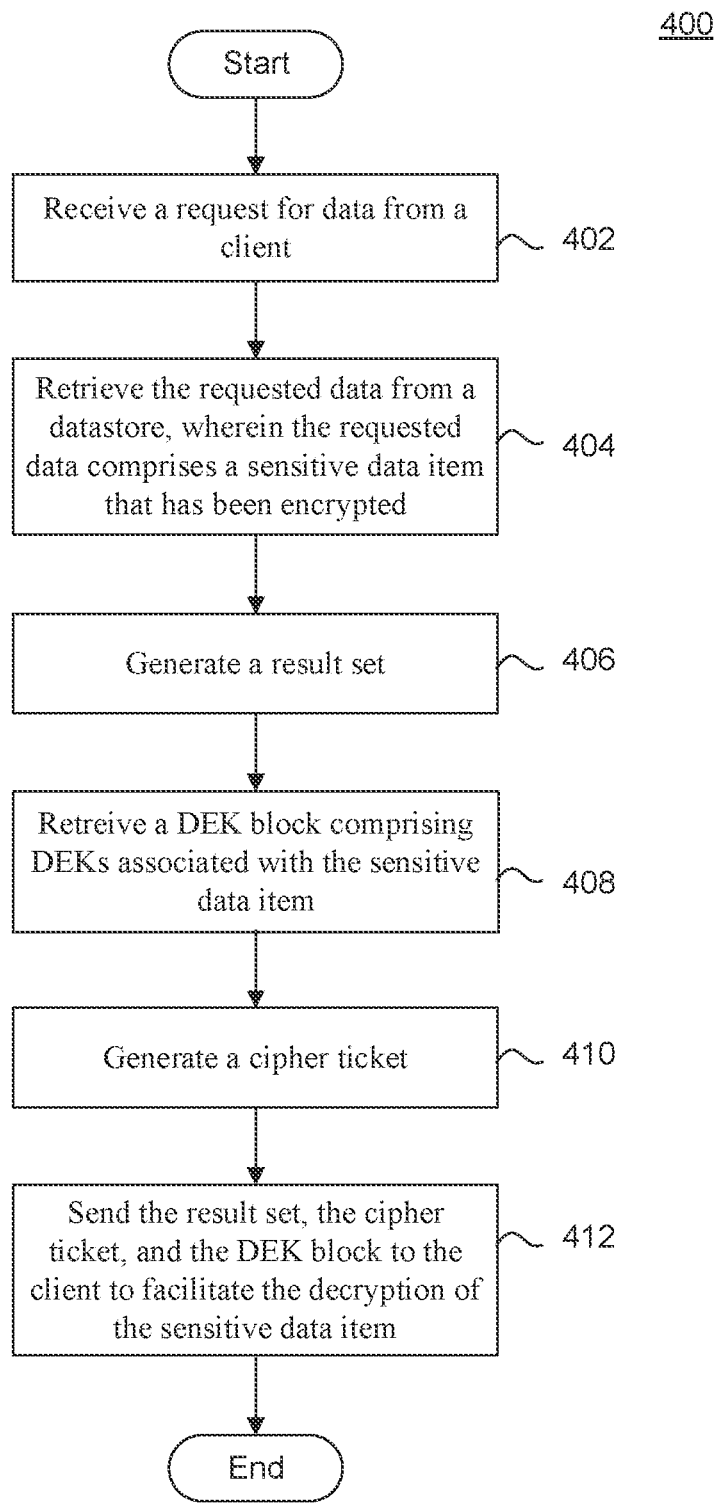
FIG. 4 is a flowchart illustrating a process for decrypting sensitive data items using a zero-knowledge encryption protocol, according to some embodiments.

FIG. 4 is a flowchart for a method 400 for facilitating decryption of sensitive data items, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 2. However, method 400 is not limited to that example embodiment.

In 402, application server 108 receives a request for data from client 102. The request may be for plaintext data 116 and/or the plaintext of ciphertext data 118.

In 404, application server 108 retrieves the requested data from datastore 114.

Application server 108 may send a request for the requested data to datastore 114. In response, application server 106 may receive the requested data from datastore 114. The received data may include ciphertext data 118 from datastore 114 such that each sensitive data item in the ciphertext data 118 has been encrypted by a respective DEK 112.

In 406, application server 108 generates a result set 202. Application server 108 may modify each sensitive data item in the received data for inclusion in the result set. For example, application server 108 may replace each sensitive data item in the received data with a placeholder identifier. Application server 108 may also add an encryption field to each data item in the received data indicating whether the value of the respective data item has been encrypted.

In 408, application server 108 retrieve a DEK block 208 comprising the DEKs 112 associated with the sensitive data items from DEK manager 110. DEK manager 110 may include the requested DEKs 112 in DEK block 208. For example, DEK manager 110 may include a data item for each DEK 112 in DEK block 208. Each data item may include a DEK identifier for the respective DEK 112. Each data item may include a KEK identifier for the respective DEK 112. The KEK identifier may identify a KEK 106 in crypto service 104 that encrypted the respective DEK 112. Each data item may include the encrypted DEK 112 itself. DEK manager 110 may encrypt the data items in DEK block 208 using crypto service 104's public cryptography key. DEK manager 110 may also include a cryptography signature in DEK block 208. DEK manager 110 may generate the cryptography signature by signing DEK block 208 using its private cryptography key.

Application server 108 may confirm that the DEK block 208 has not been changed since DEK manager 110 signed it by verifying the cryptography signature in the DEK block 208 using the corresponding public cryptography key of DEK manager 110.

In 410, application server 108 generates a cipher ticket 206. Application server 108 may include a valid to timestamp 210 in cipher ticket 206. Time stamp 210 may represent a period of time that the cipher ticket 206 is valid. Application server 108 may include a user identifier 212 in cipher ticket 206. User identifier 212 may represent a user who can request crypto service 104 to process cipher ticket 206.

Application server 108 may include encrypted data 214 in cipher ticket 206.

Encrypted data 214 may include a data block for each sensitive data item in result set 202. A data block may include a semantic domain, a DEK identifier, and a data point for sensitive data item 204. A semantic domain may indicate a field of the respective sensitive data item. A DEK identifier may be an identifier for the respective DEK 112 used to encrypt the respective sensitive data item. A data point may include the placeholder identifier and ciphertext value of the respective sensitive data item. The data block may also include a decryption type. The decryption type may specify that the respective sensitive data item is to be decrypted to full plaintext. The decryption type may also specify that the respective sensitive data item is to be decrypted with a partial mask.

In some embodiments, application server 108 may encrypt encrypted data 214 using a public cryptography key of crypto service 104.

In some other embodiments, application server 108 may encrypt encrypted data 214 using a symmetric cryptography key. Application server 108 may then encrypt the symmetric cryptography key using the public cryptography key of crypto service 104. Application server 108 may store the encrypted symmetric key in cipher ticket 206. This hybrid approach may decrease the time to perform the encryption when there are a large of data number of data points representing sensitive data items.

Application server 108 may include a cryptography signature 216 in cipher ticket 206. Application server 108 may generate cryptography signature 216 by signing cipher ticket 206 using its private cryptography key.

In 412, application server 108 sends the result set 202, the cipher ticket 206, and DEK block 208 to client 102.

Client 102 may send the cipher ticket 206 and the DEK block 208 to crypto service 104. Crypto service 104 may validate cipher ticket 206. Crypto service 104 may confirm that the correct user sent cipher ticket 106. Crypto service 104 may verify cryptography signature 216 in cipher ticket 206 using the corresponding public cryptography key of application server 108.

After validating cipher ticket 206, crypto service 104 may decrypt encrypted data 214 in cipher ticket 206. In some embodiments, crypto service 104 may decrypt encrypted data 214 using its private cryptography key.

In some other embodiments, where application server 108 encrypted data 214 using an encrypted symmetric cryptography key stored in cipher ticket 206, crypto service 104 may first decrypt the symmetric cryptography key stored in cipher ticket 206 using its private cryptography key. Crypto service 104 may then decrypt encrypted data 214 using the decrypted symmetric cryptography key.

After decrypting encrypted data 214 in cipher ticket 206, crypto service 104 may decrypt DEK block 208 using its private cryptography key. Crypto service 104 may then decrypt a ciphertext value of a data point in a data block 216 in decrypted encrypted data 214 using a respective DEK in the decrypted DEK block 208. Crypto service 104 may then use the decrypted DEK to decrypt the ciphertext value of the data point in the data block 216 in decrypted encrypted data 214.

After decrypting the ciphertext values in the data blocks, crypto service 104 may generate plaintext ticket 218. Plaintext ticket 218 may include a data block for each sensitive data item in result set 202. A data block may include a semantic domain, a DEK identifier, and a data point for a sensitive data item. The semantic domain may indicate the field name of the respective sensitive data item. The DEK identifier may be an identifier for the DEK 112 to be used to encrypt the respective sensitive data item. The data point may include the placeholder identifier and the plaintext value of the respective sensitive data item. The data block may also include a decryption type. The decryption type may specify that the respective sensitive data item is decrypted to full plaintext. The decryption type may also specify that the respective sensitive data item is decrypted with a partial mask.

Crypto service 104 may encrypt plaintext ticket 218 using the public cryptography key of client 102. Crypto service 104 may also skip encrypting plaintext ticket 218 using the public cryptography key of client 102.

Crypto service 104 may also include a cryptography signature in plaintext ticket 218. Crypto service 104 may generate the cryptography signature by signing plaintext ticket 218 using its private cryptography key.

Crypto service 104 may send plaintext ticket 218 to client 102. Client 102 may then merge plaintext ticket 218 with result set 202. Client 102 may merge plaintext ticket 218 with result set 202 by replacing each placeholder identifier in result set 202 with the corresponding plaintext value in plaintext ticket 218.

Figure 5:
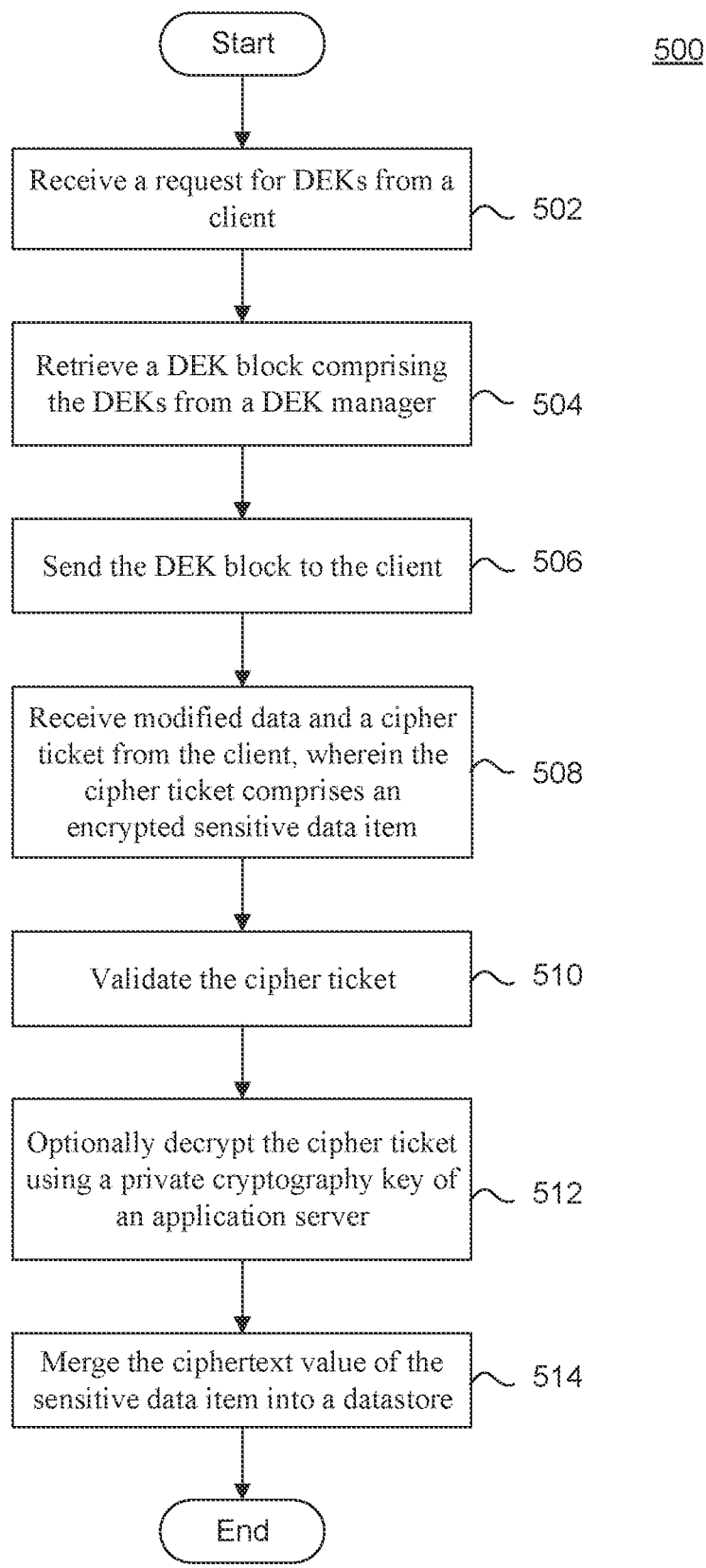
FIG. 5 is a flowchart illustrating a process for encrypting sensitive data items using a zero-knowledge encryption protocol, according to some embodiments.

FIG. 5 is a flowchart for a method 500 for facilitating encryption of sensitive data items, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 500 shall be described with reference to FIGS. 1 and 3. However, method 500 is not limited to that example embodiment.

In 502, application server 108 receives a request for DEKs 112 from client 102. Prior application server 108 receiving the request, client 102 may receive entered data 302. Client 102 may receive entered data 302 from a user, Entered data 302 may include ordinary data items. Entered data 302 may also include sensitive data items. After receiving entered data 302, client 102 may send the request for the DEKs 112 to application server 108.

In 504, application server 108 retrieves a DEK block 310 comprising the requested DEKs 112 from DEK manager 110. DEK manager 110 may generate the DEK block 310. DEK manager 110 may include a data item for each requested DEK 112 in DEK block 310. Each data item may include a DEK identifier for the respective DEK 112. Each data item may include a KEK identifier for the KEK 106 that encrypted the respective DEK 112. Each data item may include the encrypted DEK 112 itself. DEK manager 110 may encrypt the data items in DEK block 310 using crypto service 104's public cryptography key. DEK manager 110 may also include a cryptography signature in DEK block 310. DEK manager 110 may generate the cryptography signature by signing DEK block 310 using its private cryptography key. DEK manager 110 may send the DEK block 310 to application server 108.

In 506, application server 108 sends the DEK block to client 102.

Client 102 may replace the values of the sensitive data items in entered data 302 with corresponding placeholder identifiers, thereby generating modified data 306. Client 102 may also generate plaintext ticket 308. Plaintext ticket 308 may include a data block for each sensitive data item in modified data 306. A data block may include a semantic domain, a DEK identifier, and a data point for a sensitive data item. The semantic domain may indicate the field name of the respective sensitive data item. The DEK identifier may be an identifier for the DEK 112 to be used to encrypt the respective sensitive data item. The data point may include the placeholder identifier and the plaintext value of the respective sensitive data item.

Client 102 may encrypt plaintext ticket 308 using the public cryptography key of crypto service 104. Client 102 may also include a cryptography signature in plaintext ticket 308. Client 102 may generate the cryptography signature by signing plaintext ticket 308 using its private cryptography key. Client 102 may send plaintext ticket 308 and DEK block 310 to crypto service 104.

Crypto service 104 may generate cipher ticket 314. Crypto service 104 may include a valid to timestamp 316 in cipher ticket 314. Valid to time stamp 316 may represent a period of time that the cipher ticket 314 is valid. Crypto service 104 may include a user identifier 318 in cipher ticket 314. User identifier 318 may represent a principal (e.g., user, computing system, software program, or technical component) who requested crypto service 104 to process the cipher ticket 314. For example, user identifier 318 may represent the user who requested the creation of cipher ticket 314 and requested application server 108 to persist the decrypted encrypted data 320 inside cipher ticket 314 into the ciphertext data 118 of datastore 114.

Crypto service 104 may include encrypted data 320 in cipher ticket 314. Encrypted data 320 may include a data block for each sensitive data item in entered data 302. A data block may include a semantic domain, a DEK identifier, and a data point for a sensitive data item. The semantic domain may indicate the field name of the respective sensitive data item. The DEK identifier may be an identifier for the DEK 112 used to encrypt the respective sensitive data item. The data point may include the placeholder identifier and the ciphertext value of the respective sensitive data item.

To generate the ciphertext value for a sensitive data item, crypto service 104 may decrypt DEK block 310 using its private cryptography key. Crypto service 104 may then encrypt the plaintext value of the sensitive data item using the corresponding DEK 112 in DEK block 310. To perform the encryption, crypto service 104 may identify the corresponding DEK 112 in DEK block 310 (e.g., via the corresponding DEK identifier in DEK block 310). Crypto service 104 may also identify the KEK 106 used to encrypt the DEK 112 (e.g., via the corresponding KEK identifier in DEK block 310). Crypto service 104 may then decrypt the corresponding DEK 112 in DEK block 310 using the identified KEK 106. Once crypto service 104 has decrypted the DEK 112, crypto service 104 may encrypt the plaintext value of the sensitive data item using the decrypted DEK key 112. Crypto service 104 may then encrypt encrypted data 320 using the public cryptography key of application server 108.

Crypto service 104 may include a cryptography signature 324 in cipher ticket 314. Crypto service 104 may generate cryptography signature 324 by signing cipher ticket 314 using its private cryptography key. Crypto service 104 may then send cipher ticket 314 to client 102.

In 508, application server 108 receives modified data 306 and cipher ticket 314 from client 102.

In 510, application server 108 validates cipher ticket 314. Application server 108 may confirm that the correct user sent cipher ticket 106. Application server 108 may confirm that the cipher ticket 314 has not expired, Application server 108 may verify cryptography signature 324 in cipher ticket 314 using the corresponding public cryptography key of crypto service 104.

In 512, application server 108 may decrypt encrypted data 320 in cipher ticket 314. Application server 108 may decrypt encrypted data 320 using its private cryptography key.

In 514, application server 108 merges the ciphertext values into datastore 114. Application server 108 saves the ciphertext into datastore 114. For example, application server 108 may replace the placeholders in modified data 306 with ciphertext and then updating datastore 114.

Figure 6:
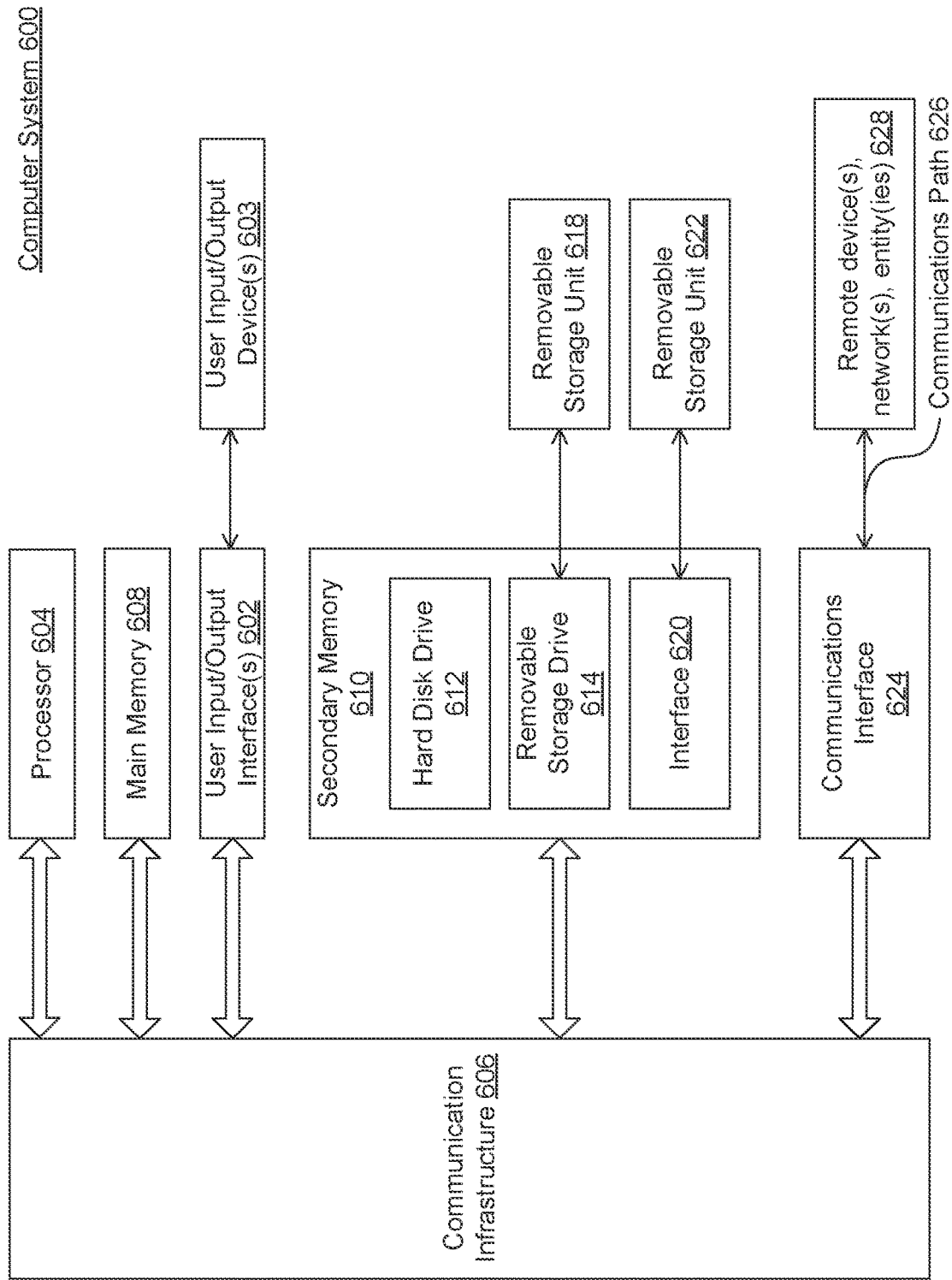
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof. For example, computer system 600 may be used to implement methods 400 and 500.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for decrypting a sensitive data item using a zero-knowledge encryption protocol, comprising:
   receiving, by at least one processor, a request to decrypt the sensitive data item from a client;
   retrieving, by the at least one processor, the requested sensitive data item from a data store, wherein the data store excludes storage of a plaintext value of the sensitive data item;
   generating, by the at least one processor, a result set, wherein the generating the result set further comprises:
     storing the sensitive data item in the result set; and
     replacing a ciphertext value of the sensitive data item in the result set with a placeholder identifier that uniquely identifies the sensitive data item;
   retrieving, by the at least one processor, a data encryption key (DEK) block from a DEK manager, wherein the DEK block comprises a DEK associated with the sensitive data item;
   generating, by the at least one processor, a cipher ticket comprising a valid to timestamp, a user identifier, and the ciphertext value of the sensitive data item; and
   sending, by the at least one processor, the result set, the cipher ticket, and the DEK block to the client for decryption of the ciphertext value of the sensitive data item.

2. The computer implemented method of claim 1, wherein the ciphertext value of the sensitive data item has been encrypted by the DEK.

3. The computer implemented method of claim 1, wherein the generating the result set further comprises:
   storing, by the at least one processor, an encryption field with the sensitive data item in the result set, wherein the encryption field specifies that the sensitive data item is encrypted.

4. The computer implemented method of claim 1, further comprising:
   determining, by the at least one processor, that the DEK block has not been modified by verifying a cryptographic signature in the DEK block using a public cryptographic key of the DEK manager.

5. The computer implemented method of claim 1, wherein the valid to timestamp specifies a period of time that the cipher ticket is valid, and the user identifier specifies a principal who can request the crypto service to process the cipher ticket.

6. The computer implemented method of claim 1, wherein the generating the cipher ticket further comprises:
   adding, by the at least one processor, a cryptographic signature to the cipher ticket by signing the cipher ticket using a private cryptography key of an application server.

7. The computer implemented method of claim 1, wherein the generating the cipher ticket further comprises:
   encrypting, by the at least one processor, the cipher ticket with a public cryptography key of a crypto service.

8. A system decrypting a sensitive data item using a zero-knowledge encryption protocol, comprising:
   a memory; and
   at least one processor coupled to the memory and configured to:
     receive a request to decrypt a sensitive data item from a client;
     retrieve the requested sensitive data item from a data store, wherein the data store excludes storage of a plaintext value of the sensitive data item;

generate a result set, wherein to generate the result set, the at least one processor is further configured to:
    store the sensitive data item in the result set; and
    replace a ciphertext value of the sensitive data item in the result set with a placeholder identifier that uniquely identifies the sensitive data item;
retrieve a data encryption key (DEK) block from a DEK manager, wherein the DEK block comprises a DEK associated with the sensitive data item;
generate a cipher ticket comprising a valid to timestamp, a user identifier, and the ciphertext value of the sensitive data item; and
send the result set, the cipher ticket, and the DEK block to the client for decryption of the ciphertext value of the sensitive data item.

9. The system of claim 8, wherein the ciphertext value of the sensitive data item has been encrypted by the DEK.

10. The system of claim 8, wherein to generate the result set, the at least one processor is further configured to:
    store an encryption field with the sensitive data item in the result set, wherein the encryption field specifies that the sensitive data item is encrypted.

11. The system of claim 8, wherein the at least one processor is further configured to:
    determine that the DEK block has not been modified by verifying a cryptographic signature in the DEK block using a public cryptographic key of the DEK manager.

12. The system of claim 8, wherein the valid to timestamp specifies a period of time that the cipher ticket is valid, and the user identifier specifies a principal who can request the crypto service to process the cipher ticket.

13. The system of claim 8, wherein to generate the cipher ticket, the at least one processor is further configured to:
    add a cryptographic signature to the cipher ticket by signing the cipher ticket using a private cryptography key of an application server.

14. The system of claim 8, wherein to generate the cipher ticket, the at least one processor is further configured to:
    encrypt the cipher ticket with a public cryptography key of a crypto service.

15. A non-transitory computer-readable medium having instructions stored thereon that, when executed by at least one computing device, cause the at least one computing device to perform operations comprising:
    receiving a request to decrypt a sensitive data item from a client;
    retrieving the requested sensitive data item from a data store, wherein the data store excludes storage of a plaintext value of the sensitive data item;
    generating a result set, wherein the generating the result set further comprises:
        storing the sensitive data item in the result set; and
        replacing a ciphertext value of the sensitive data item in the result set with a placeholder identifier that uniquely identifies the sensitive data item;
    retrieving a data encryption key (DEK) block from a DEK manager, wherein the DEK block comprises a DEK associated with the sensitive data item;
    generating a cipher ticket comprising a valid to timestamp, a user identifier, and the ciphertext value of the sensitive data item; and
    sending the result set, the cipher ticket, and the DEK block to the client for decryption of the ciphertext value of the sensitive data item.

16. The non-transitory computer-readable medium of claim 15, wherein the ciphertext value of the sensitive data item has been encrypted by the DEK.

17. The non-transitory computer-readable medium of claim 15, wherein the generating the result set further comprises:
    storing an encryption field with the sensitive data item in the result set, wherein the encryption field specifies that the sensitive data item is encrypted.

18. The non-transitory computer-readable medium of claim 15, wherein the operations further comprise:
    determining that the DEK block has not been modified by verifying a cryptographic signature in the DEK block using a public cryptographic key of the DEK manager.

19. The non-transitory computer-readable medium of claim 15, wherein the valid to timestamp specifies a period of time that the cipher ticket is valid, and the user identifier specifies a principal who can request the crypto service to process the cipher ticket.

20. The non-transitory computer-readable medium of claim 15, wherein the generating the cipher ticket further comprises:
    adding a cryptographic signature to the cipher ticket by signing the cipher ticket using a private cryptography key of an application server.

* * * * *